United States Patent

[11] 3,604,841

[72] Inventors Adrian B. Ettlinger
Hastings-on-Hudson, N.Y.;
Renville H. McMann, Jr., New Canaan, Conn.

[21] Appl. No. 820,790
[22] Filed May 1, 1969
[45] Patented Sept. 14, 1971
[73] Assignee Columbia Broadcasting System, Inc. New York, N.Y.

[54] CORRECTION APPARATUS FOR ENCODED COLOR TELEVISION SIGNALS
4 Claims, 3 Drawing Figs.

[52] U.S. Cl. .......... 178/5.4 R, 178/5.4 CR, 178/5.4 HE
[51] Int. Cl. .......... H04n 1/00
[50] Field of Search .......... 178/5.2, 5.4 CR, 5.4 SD, 5.4 S, 5.4, 5.4 HE

[56] References Cited

UNITED STATES PATENTS

| | | | |
|---|---|---|---|
| 3,405,230 | 10/1968 | Parker .......... | 178/5.4 SD |
| 3,428,745 | 2/1970 | Coleman .......... | 178/5.4 CR |
| 3,507,983 | 4/1970 | Leman .......... | 178/5.4 CR |
| 3,518,362 | 6/1970 | Fessard .......... | 178/5.4 |

*Primary Examiner*—Robert L. Griffin
*Assistant Examiner*—Richard P. Lange
*Attorney*—Brumbaugh, Graves, Donohue & Raymond

ABSTRACT: In one embodiment of the invention described herein, synchronous blue and red color carrier correction signals of proper phase are developed from an encoded color television signal. The carrier signals have introduced therein fixed increments of correction to produce thereby blue and red black level correction signals. The signals are also supplied to a set of modulator circuits wherein the signals are modulated by decoded blue and red color component signals. The resulting gain control signals, which have amplitudes proportional to the instantaneous amplitudes of the decoded signals, are also corrected in increments. Furthermore, the signals are supplied to another set of modulator circuits wherein the signals are modulated by signals comprising the differences between gamma corrected and linear decoded blue and red color component signals. The resulting gamma correction signals have introduced therein fixed increments of correction and are thereafter combined with the color black level and gain control signals and added to the encoded color television signal.

INVENTORS
ADRIAN B. ETTLINGER &
BY RENVILLE H. McMANN, JR.
Brumbaugh, Graves, Donohue & Raymond
ATTORNEYS INVENTORS
ADRIAN B. ETTLINGER &
RENVILLE H. McMANN, JR.
BY
Brumbaugh, Graves, Donohue & Raymond
their ATTORNEYS

CORRECTION APPARATUS FOR ENCODED COLOR TELEVISION SIGNALS

BACKGROUND OF THE INVENTION

This invention relates to correction apparatus for television signals and, more particularly, to apparatus for correcting encoded color television signals.

In color television broadcasting systems, the control of color quality and the correction of color balance errors is generally performed where the optical image is converted into electrical signals, that is, at the camera. Such systems do not provide for the introduction of color balance corrections to the television program signals after the signals have been NTSC encoded.

Although such systems have not provided for correction after the signals have been encoded, an obvious method of introducing color balance corrections into the encoded signals would include the steps of decoding the encoded NTSC signal, passing the decoded red, blue and green color component signals thereof through conventional variable gain and black level circuits and reencoding the corrected color component signals. Such a process, however, would require extremely stable and consistent circuit performance and would require critically precise balance for proper transmission performance.

SUMMARY OF THE INVENTION

It is therefore an object of the present invention to provide correction apparatus for adding color balance corrections to encoded color television signals.

It is a further object of the present invention to provide correction apparatus through which encoded color television signals will pass directly and wherein color correction signals are added to the encoded color television signals.

These and other objects of the invention are accomplished by supplying the encoded signal simultaneously to an output amplifier and to a network wherein signals representative of the color information in the signal are developed.

In one embodiment of the invention, the signals represent different primary color components in the color information and have introduced therein fixed increments of correction before being added as color black level correction signals to the encoded color television signal. The same signals are also supplied to a number of modulators wherein in one set of modulators the signals are modulated by decoded corresponding primary color components of the encoded color television signal to produce gain control signals. In another set of modulators, the signals are modulated by signals comprising the differences between gamma corrected and linear decoded corresponding primary color components of the encoded color television signal to produce gamma correction signals. Again, both the gain control and the gamma correction signals have introduced therein increments of correction before being added to the encoded color television signal. The increments of correction are typically introduced by an operator who continuously views a monitor that displays the television signal.

DESCRIPTION OF THE PREFERRED EMBODIMENT

Figure 1:
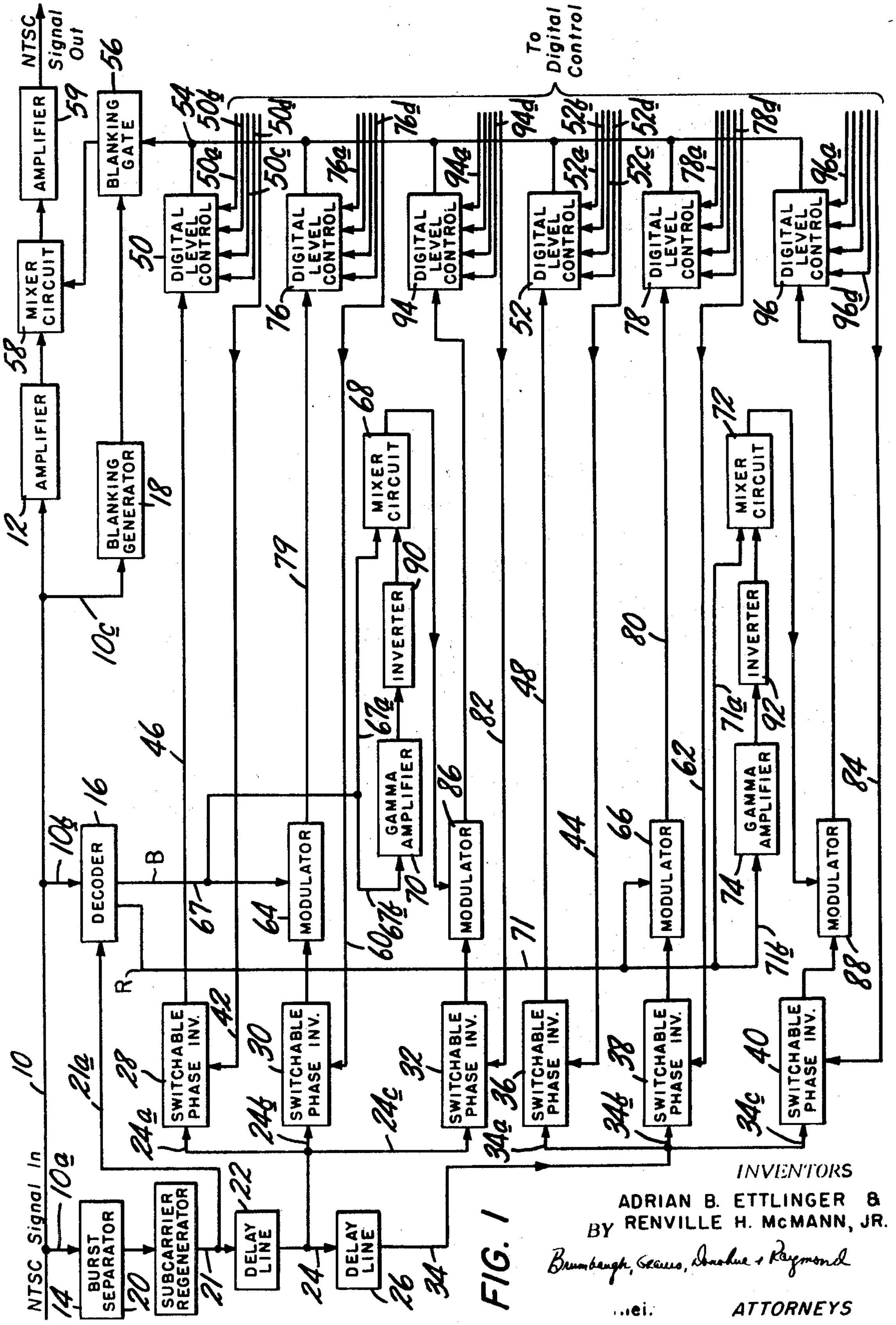
FIG. 1 is a schematic block diagram of one embodiment of a typical apparatus for correcting encoded color television signals arranged according to the present invention.

In the embodiment of typical correction apparatus for encoded color television signals illustrated in FIG. 1, color balance adjustments of color black level, gain and gamma are made to an encoded NTSC signal supplied as an input signal on a conductor 10. The conductor 10 and its branch conductors 10a, 10b and 10c conduct the NTSC signal to an amplifier 12, a burst separator 14, a decoder 16 and to a blanking generator 18, respectively.

The burst separator 14, which may be of conventional construction, responds to the color synchronizing burst signals included in the NTSC signal and supplies the unmodulated subcarrier signals to a subcarrier regenerator 20. In turn, the subcarrier regenerator 20, which comprises, for example, a burst-controlled oscillator, responds to the unmodulated subcarrier signals to generate synchronous carrier signals. As will be apparent hereinafter, the synchronous carrier signals are employed in the instant invention as phase reference signals.

From the regenerator 20, the carrier signals are supplied through the branch conductor 21a of a conductor 21 to the control input terminal of the decoder circuit 16 and through the conductor 21 to a delay line 22. The delay line 22, which may be of conventional construction, delays the synchronous carrier signals by an appropriate amount to produce synchronous negative blue subcarrier correction signals. A conductor 24 connects the blue subcarrier correction signals to a second delay line 26 and its branch conductors 24a, 24b and 24c couple the blue subcarrier signals simultaneously to three switchable phase inverters 28, 30 and 32, respectively. The delay line 26, which also may be of conventional construction, delays the blue subcarrier correction signals by an appropriate amount to produce synchronous red subcarrier correction signals. These signals are supplied along a conductor 34 and its branch conductors 34a, 34b and 34c to a trio of switchable phase inverters 36, 38 and 40, respectively.

The correction of the black level parameters of the blue and red subcarrier correction signals to achieve color black level balance adjustment in the encoded NTSC signal will be described initially herein. The switchable phase inverters 28 and 36 include control input terminals to which control signals are supplied along conductors 42 and 44, respectively. The conductors 42 and 44 are connected to a control panel (not shown) which may include a pair of toggle switches, for example, for supplying the control signals, for example, signals at ground potential, to the control input terminals of the inverters 28 and 36. When control signals are present, the inverters will supply phase inverted output blue and red subcarrier correction signals or positive blue and negative red subcarrier correction signals. In the absence of control signals, the phase inverters 28 and 36 will supply output blue and red subcarrier correction signals which are in-phase with the input blue and red subcarrier correction signals, respectively. Although the control signals are described herein as being supplied under the control of a manually operative switch, it will be understood that the same signals may be supplied automatically under program control.

Essentially, as may be understood, color black level corrections to the NTSC signal may be achieved by the addition of a constant subcarrier signal of appropriate phase and amplitude. For example, red, green and blue black level control could be implemented simply by adding to the NTSC signal constant chroma signals with phase angles of 104°, 241° and 347°. Rather than utilize three separate amplitude parameters for red, blue and green correction, the instant invention employs correction signals for two parameters only, red and blue, which, through the appropriate switching of the phase inverters 28 and 36, are entered in either polarity. In particular, a plus green correction will be entered as a minus red and blue correction. A negative green correction will be entered as a plus red and blue correction. Of course, a green black level control channel may be added if desired.

From the switchable phase inverters 28 and 36, the blue and red subcarrier correction signals are supplied through conductors 46 and 48 to a pair of digital level control circuits 50 and 52. The digital level control circuits 50 and 52, in response to appropriate control signals supplied to the control input terminals thereof along conductors 50a, 50b, 50c and 50d; and 52*a*, 52*b*, 52*c* and 52*d*; respectively, introduce into the blue and red subcarrier correction signals fixed increments of correction. In the typical digital level control circuit described hereinafter with reference to FIG. 2, amplitude reductions in the input signals ranging between seven-eights the original amplitudes to unity are achieved. The conductors 50*a*–50*d* and 52*a*–52*d* are also coupled to the control panel (not shown) which may include rotary switches, for example, for enabling selected input control terminals of the circuits 50 and 52.

From the digital level control circuits 50 and 52, the blue and red black level correction subcarrier signals are coupled via a common conductor 54 to a blanking gate 56. As will be understood, the color black level correction signals require processing through blanking circuitry to remove therefrom the vertical and horizontal blanking intervals. Accordingly, the blanking generator 18 responds to the unmodified NTSC signals to supply control signals to the blanking gate 56 which disable the blanking gate 56 during the vertical and horizontal blanking intervals. After transmission through the blanking gate 56, the color black level correction signals are supplied to a mixer circuit 58 wherein the signals are added to the NTSC signal amplified by the amplifier 12. The corrected NTSC signal is then amplified by an amplifier 59 and supplied as an output signal for broadcasting.

The introduction of color gain correction to an NTSC signal requires that a gain control signal with phase corresponding to the required hue shift be added to the NTSC signal. In addition, the amplitude of the signal must have an amplitude which varies in proportion to the absolute instantaneous amplitude of that hue component. The color gain correction circuitry comprises the switchable phase inverters 30 and 38. Again, under the control of signals supplied along conductors 60 and 62 and originating at the control panel (not shown), the switchable phase inverters 30 and 38 supply either in-phase or phase inverted blue correction and red correction subcarrier signals to a pair of modulators 64 and 66.

As above-mentioned, the NTSC signal is supplied along branch conductor 10*b* to the decoder circuit 16. The decoder circuit 16, which may be of conventional construction and, accordingly, need not be described herein, detects the chrominance information in the NTSC signal under the control of the phase reference synchronous carrier signals generated by the regenerator 20. Although the three primary color components, red, blue and green, are available as separate output signals, only the decoded blue and red signals are utilized herein as modulating signals.

The decoded blue color component signal (B) is supplied to the control input terminal of the modulator 64 through a conductor 67 and to one input terminal of a mixer circuit 68 and the input terminal of a gamma amplifier 70 through the branch conductors 67*a* and 67*b*, respectively, of the conductor 67. Similarly, the decoded red color component signal (R) is supplied to the control input terminal of the modulator 66 via a conductor 71 and to the input terminals of a mixer circuit 72 and a gamma amplifier 74, respectively, through the branch conductors 71*a* and 71*b* of the conductor 71. In the modulators 64 and 66, the blue and red color gain correction subcarrier signals are modulated by the decoded blue and red color component signals supplied from the decoder 16 and then supplied to a pair of digital level control circuits 76 and 78 through a pair of conductors 79 and 80, respectively. The digital level control circuits 76 and 78, which may be of the type described hereinafter with reference to FIG. 2, include control input terminals which are coupled via a plurality of conductors 76*a*–76*d* and 78*a*–78*d* to the control panel (not shown). Again, under the control of the control panel, the digital control circuits 76 and 78 introduce fixed increments of correction into color gain correction signals and supply the signals to the common output conductor 54. The signals are added to the color black level correction signals, transmitted by the gate 56 and thereupon added to the input NTSC signal.

For the introduction of gamma correction to the NTSC signal, the switchable phase inverters 32 and 40 are provided. Again, the operations of the inverters 32 and 40 are controlled by signals supplied from the control panel (not shown) to the control input terminals of the inverters along the conductors 82 and 84. Accordingly, the inverters 32 and 40 will supply either phase inverted or in-phase blue correction subcarrier signals and red correction subcarrier signals. From the switchable phase inverters 32 and 40, the blue and red correction subcarrier signals are supplied to a pair of modulators 86 and 88.

The basic correction signals are derived by modulating the blue and red correction subcarrier signals of appropriate phase with signals comprising the difference between gamma corrected and linear decoded primary color component signals. Accordingly, the decoded blue primary color component signal is supplied, as above-mentioned, from the decoder circuit 16 to the input terminal of the mixer circuit 68 and to the input terminal of the gamma amplifier 70 and the decoded red color component signal is supplied from the decoder circuit 16 to the input terminal of the mixer circuit 72 and to the input terminal of the gamma amplifier 74. The gamma amplifiers 70 and 74, which have predetermined transfer characteristics, 0.70, for example, supply the nonlinear blue and red color component signals through inverters 90 and 92 to the other input terminals of the mixer circuits 68 and 72. In the mixer circuits 68 and 72, the blue and red gamma signals are subtracted (because of the inversion) from the linear reproductions of the same primary color component signals and supplied as modulating signals to the control input terminals of the modulators 86 and 88. From the modulator circuits 86 and 88, the modulated blue and red subcarrier correction signals are supplied to the input terminals of a pair of digital level control circuits 94 and 96. The digital level control circuits 94 and 96, under the control of control signals supplied to the input terminal thereof from the control panel (not shown) through conductors 94*a*–94*d* and 96*a*–96*d* introduce fixed increments of correction into the gamma correction signals supplied from the modulators 86 and 88. The gamma correction signals are thereafter supplied to the conductor 54 and added to the color black level and color gain correction signals supplied from the digital level control circuits 50, 52 and 76, 78, respectively. Thereupon, the composite correction signal is transmitted by the gate 56 for addition to the NTSC signal amplified by the amplifier 12.

In operation, color black level correction signals are developed by generating synchronous blue and red subcarrier signals and supplying these signals to the switchable phase inverters 28 and 36. To enter positive blue and red black level corrections, the inverters 28 and 36, under the control of the control panel (not shown), supply phase inverted and in-phase output signals respectively. To enter positive green black level corrections, the inverters 28 and 36, under the control of the control panel, supply in-phase and phase inverted output signals, respectively. Incremental reductions in the amplitudes of the blue and red black level correction signals are implemented by the digital level control circuits 50 and 52. The signals are thereafter added to an overall correction signal and supplied through the blanking gate 56 to the mixer circuit 58 for addition to an unmodified NTSC signal.

Color gain correction signals are developed by supplying the blue and red correction subcarrier signals to the switchable inverters 30 and 38. The output signals, either inverted on in-phase, are thereafter modulated in the modulators 64 and 66 by the blue and red primary color component signals decoded by the circuit 16. After the modulated blue and red color gain correction subcarrier signals have fixed increments of correction introduced therein, the signals are added to the overall correction signal and transmitted by the gate 56 to the mixer circuit 58.

Color gamma correction signals are developed by supplying the blue and red subcarrier correction signals to the switchable inverters 32 and 40. From the inverters 32 and 40, the signals are supplied to the input terminals of the modulators 86 and 88. The blue and red primary color component signals are decoded in the circuit 16 and thereafter supplied to the gamma amplifiers 70 and 74 and to the mixer circuits 68 and 72. The output signals from the amplifiers 70 and 74 are phase inverted and thereafter subtracted from the linear primary blue and red color signals in the mixer circuits 68 and 72. The difference signals are then supplied to the modulators 86 and 88 to modulate the blue and red subcarrier correction signals. The digital level control circuits 94 and 96 introduce fixed increments of correction into the gamma correction subcarrier signals. Thereupon, the corrected signals are added to the overall correction signal and transmitted by the gate 56 to the circuit 58. The corrected NTSC signal produced by the mixer circuit 58 is then amplified by the amplifier 59 and supplied as an output signal suitable for broadcasting.

Figure 2:
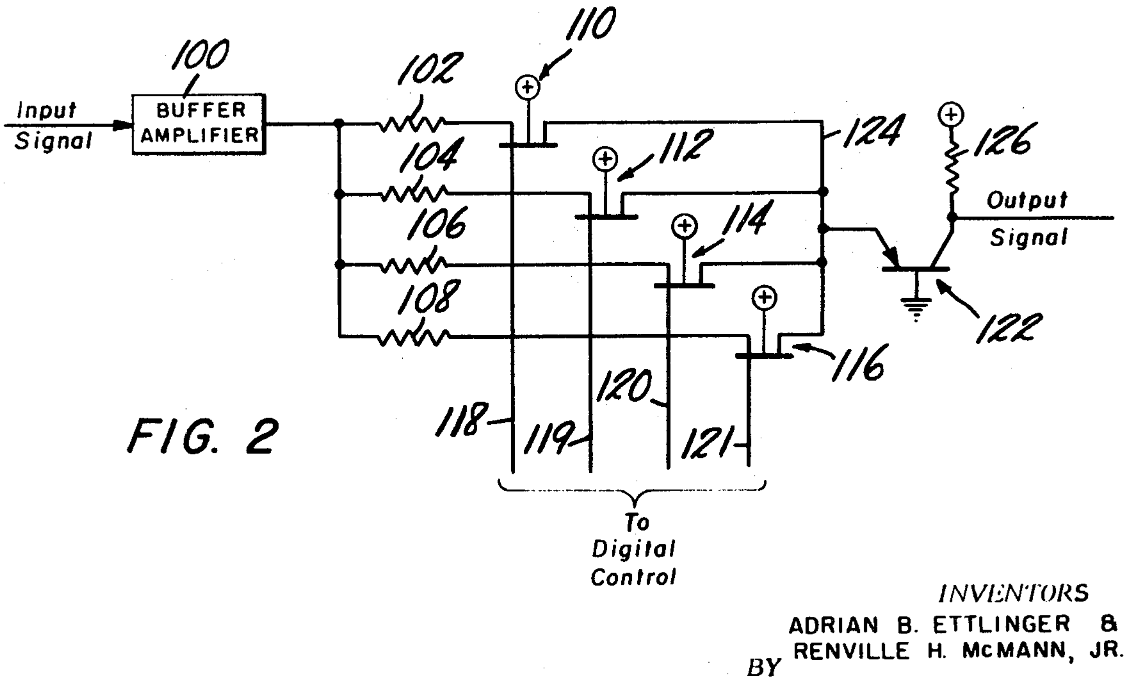
FIG. 2 is a schematic block diagram of a typical digital level control circuit for use in the correction apparatus illustrated in FIG. 1.

Referring now to FIG. 2, there is illustrated a typical digital level control circuit which may be included in the correction apparatus illustrated in FIG. 1. An input signal, for example, the blue color black level correction subcarrier signal developed by the inverter 28 of FIG. 1, is amplified by a buffer amplifier 100 and supplied simultaneously through four resistors 102, 104, 106 and 108 to the drains of four field effect (FET) transistors 110, 112, 114 and 116, respectively. To achieve incremental amplitude reduction, the resistance valves of the resistors 102, 104, 106 and 108 are preferably weighted such that 8R is the value of the resistor 108, 4R is the value of the resistor 106, 2R is the value of resistor 104 and R is the value of the resistor 102. The second gates of the transistors 110, 112, 114 and 116 are coupled to positive potentials while the first gates thereof are coupled through conductors 118, 119, 120 and 121, respectively, to a control panel (not shown).

As above-described, the control panel may include rotary switches, for example, which supply discrete enabling potentials to the digital level control circuits 50, 52; 76, 78; 94, 96 of FIG. 1 for introducing fixed increments of black level, gain and gamma correction into the encoded NTSC signal. In the control circuit of FIG. 2, through the appropriate operation of such a switch, incremental reductions ranging from seven-eighths to one-eighth the original amplitude may be made to the input signal. For example, by enabling the FET transistor 110, a relative amplitude reduction of seven-eighths is implemented. By enabling the FET transistor 114, there is produced an incremental reduction in amplitude of one-half and by enabling FET transistors 110, 112 and 114, a relative gain reduction of one-eighth is achieved.

The sources of the transistors 110, 112, 114 and 116 are coupled together and to the emitter of a common base amplifier 122 by a conductor 124. The amplifier 122 develops an output signal across an output resistor 126 coupled to a positive potential and supplies the incrementally reduced correction signal as an output signal. Although control of the digital level control circuit illustrated in FIG. 2 has been described as being achieved manually, it will be understood that the control may be effected automatically under program control equally as well.

We claim:

1. Apparatus for correcting input encoded color television signals which includes a color reference hase signal comprising:

- means for decoding said encoded color television signals to produce decoded primary color component signals;
- means for generating primary color correction signals which are in a phased relationship with the color reference phase signal of said encoded color television signals;
- means responsive to said decoded color component signals for encoding said correction signals; and
- means for adding said encoded correction signals to said input encoded color television signals to produce corrected output color encoded color television signal.

2. Apparatus as defined by claim 1 wherein said means for encoding said correction signals comprise a plurality of modulators.

3. Apparatus as defined by claim 2 wherein said plurality of modulators is responsive to at least two decoded primary color component signals and to at least two primary color correction signals for varying the amplitudes of said correction signals in proportion to the instantaneous amplitudes of the primary color component signals.

4. Apparatus as defined by claim 3 further comprising a plurality of gamma correction means responsive to at least two decoded primary color component signals for providing difference signals representative of the difference between linear and nonlinear reproductions of said decoded primary color component signals, and a plurality of modulator means responsive to the difference signals and to at least two primary color correction signals for varying the amplitudes of the primary color correction signals in proportion to the instantaneous amplitudes of the difference signals.

PO-1050
(5/69)

UNITED STATES PATENT OFFICE
CERTIFICATE OF CORRECTION

Patent No. 3,604,841 Dated September 14, 1971

Inventor(s) Adrian B. Ettlinger and Renville H. McMann, Jr.

Figure 3:
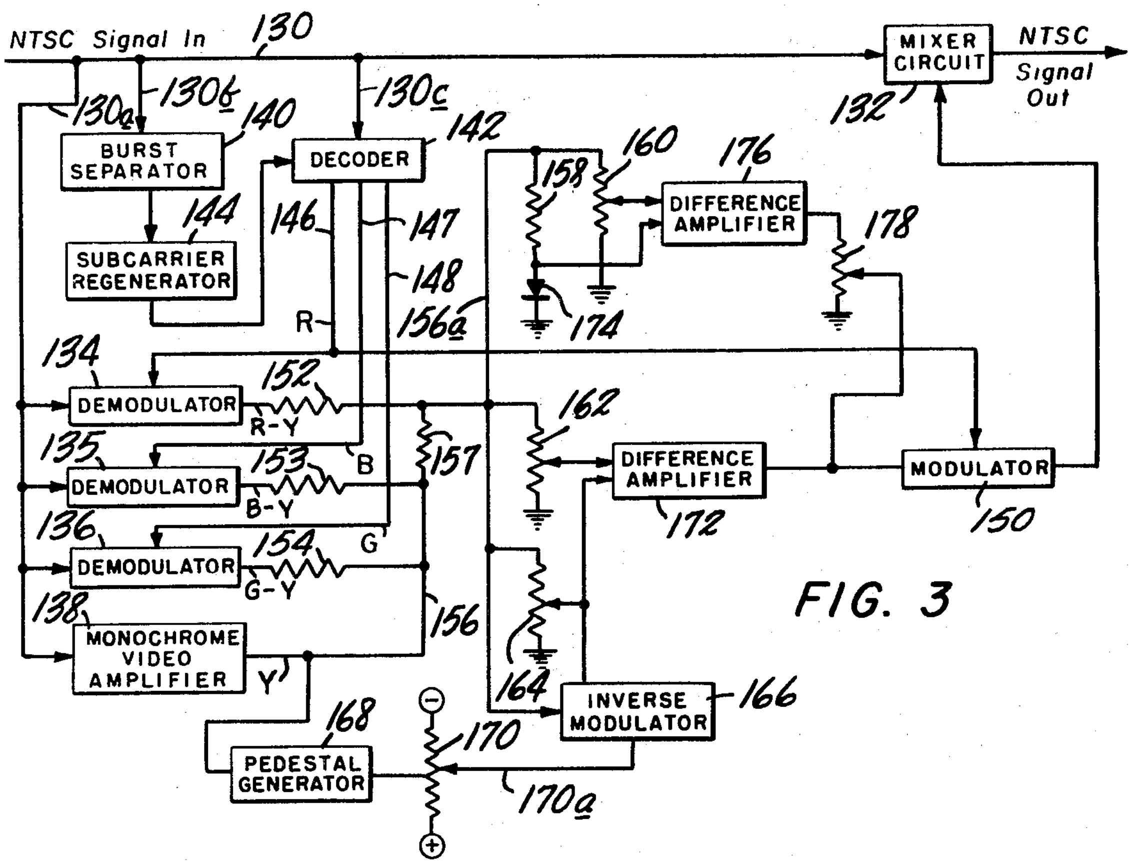

It is certified that error appears in the above-identified patent and that said Letters Patent are hereby corrected as shown below:

In the drawings, sheet 2, cancel Fig. 3.
In column 4, line 63 change "on" to --or--.
In column 5, line 24 change "valves" to --values--.
In column 6, line 14 (claim 1) change "hase" to --phase--.
In column 6, line 25 (claim 1) change "signal" to --signals--.

Signed and sealed this 28th day of March 1972.

(SEAL)
Attest:

EDWARD M.FLETCHER,JR.
Attesting Officer

ROBERT GOTTSCHALK
Commissioner of Patents